United States Patent [19]

Alexis

[11] Patent Number: 4,783,780
[45] Date of Patent: Nov. 8, 1988

[54] METHOD AND APPARATUS FOR SELECTING A FREE CHANNEL IN A MOBILE RADIO SYSTEM

[75] Inventor: Roger P. J. Alexis, Neuilly sur Seine, France

[73] Assignee: U.S. Philips Corp., New York, N.Y.

[21] Appl. No.: 877,557

[22] Filed: Jun. 23, 1986

[30] Foreign Application Priority Data

Jul. 9, 1985 [FR] France ................ 85 10490

[51] Int. Cl.[4] ............................................. H04J 3/16
[52] U.S. Cl. .................................... 370/95; 379/59; 379/63; 455/33; 455/56
[58] Field of Search ............ 370/50, 95, 24; 379/59, 379/63; 455/33, 34, 54, 53, 56

[56] References Cited

U.S. PATENT DOCUMENTS

| | | | |
|---|---|---|---|
| 4,545,071 | 10/1985 | Freeburg | 455/33 |
| 4,638,479 | 1/1987 | Alexis | 370/95 |
| 4,670,906 | 6/1987 | Thro | 455/33 |
| 4,680,583 | 7/1987 | Grover | 455/33 |

Primary Examiner—Douglas W. Olms
Assistant Examiner—Wellington Chin
Attorney, Agent, or Firm—Jack E. Haken; Leroy Eason

[57] ABSTRACT

In a mobile radio system, a method and apparatus for enabling a mobile station (M) to select a free duplex communication channel for communication with a fixed station (F). The fixed stations in the system detect duplex channels which are engaged in their rising paths and transmit a list of such engaged duplex channels over a signalling path. The fixed stations further transmit over such signalling path, in time division channels respectively allocated to them, a list of the duplex channels which they use and which are engaged in the descending paths. In the mobile station (M) the power levels of the signals received in the signalling path are measured and compared with an interference threshold power level to identify duplex channels of interfering fixed stations. A free duplex channel of a fixed station (F) is selected by the mobile station (M) by excluding channels of interfering fixed stations and channels of fixed station (F) which are engaged.

9 Claims, 4 Drawing Sheets

FIG.1

FIXED STATION

MOBILE STATION
FIG. 4

METHOD AND APPARATUS FOR SELECTING A FREE CHANNEL IN A MOBILE RADIO SYSTEM

BACKGROUND OF THE INVENTION

1. Field of the Invention

The invention relates to a method of selecting a free channel in a cellular mobile radio system in which each rising communications path from the mobile station is associated with a given descending communications path from the fixed stations so as to form a duplex channel providing communication between any one of the fixed stations and any one of the mobile stations. In accordance with such method, in order to seek a free duplex channel between a fixed station F and a mobile station M:

in fixed station F, the already engaged duplex channels in the rising path for which the received power is higher than a first given threshold are detected and the addresses of such engaged channels are transmitted over one of the channels of a signalling path formed of equidistant time intervals successively allocated periodically to all the fixed stations of a set of cells constituting the cellular system;

in mobile station M, the addresses are determined of the engaged duplex channels in the descending path for which the received power is higher than a second given threshold, and a free duplex channel is selected from among channels having a different address then the addresses of engaged channels.

The invention also relates to apparatus for implementing this method in the fixed and mobile stations.

2. Description of the Related Art

Such a free channel selection method for a cellular mobile radio system is described in French Pat. No. 2 556 532 filed on Dec. 9, 1983, in the applicant's name, corresponding to U.S. Pat. No. 4,638,479, issued Jan. 20, 1987. This method has the advantage of making it possible to allocate all the communication channels to each cell in the system, whereas, in conventional systems, each set of channels is distributed in a group of "motif" cells, with the "motif" repeated throughout the communications system.

However, the implementation of this known method may give rise to difficulties in certain types of mobile radio system with respect to the determination in a mobile station of the engaged channels in the descending communications path.

Such implementation is convenient only in systems of the time-share multiple-access type (abbreviated to TSMA) in which the communication channels forming the rising and descending paths are time-multiplexed time channels. In a TSMA system, a mobile station has a wide-band receiver sequentially receiving all the channels of the descending path so that, in it, it is easy to detect those channels which are engaged simply by measuring the level of the signal received in the time intervals corresponding to the various channels and by comparing these levels with a predetermined threshold.

In mobile radio systems of the frequency division multiple-access type (abbreviated to FDMA), the communication channels are frequency-multiplexed frequency channels and the receiver of a mobile station can receive only one channel at a time so that, in order to measure the level in all the channels of the descending path, the receiver's frequency must vary in steps in order successively to explore all the channels. In a 255-channel system, for instance, to be explored in 125 ms (the frame period of a comparable TSMA system), each frequency step must last about 0.5 ms. To take account of the fading phenomenon caused by multiple tracks, an average of the measurement of the levels in the channels over two or three exploration processes must be struck. The relatively long time (2 to 3 times 125 ms) needed to seek a free channel by this method causes to major drawbacks during the stand-by period, and is highly annoying if the channel has to be changed during a communication, if, for example, the channel in use becomes cluttered. Communication must, in fact, be suspended while a free channel is being sought. To avoid this drawback, it is possible to use an auxiliary receiver continuously exploring the channels to seek a second free one in anticipation of the time when the main receiver has to change channels, but this is a complex solution.

Finally, it should be noted that there is a growing tendency in practice to use mixed systems combining frequency and time-distributed multiple-access systems making it easier than with purely TSMA of FDMA to provide the fixed stations with a variable number or channels depending on the area (urban or rural) or on the time to take account of the gradual increase in the number of users.

It is thus possible to produce a mixed TSMA/FDMA variable capacity system by frequency-multiplexing a variable number of TMSA frames. A distinction may be made between TSMA wide-band/FDMA systems in which each TSMA frame occupies a greater bandwidth than the coherence band of a channel, of the order of 200 KHz, and narrow-band TSMA/FDMA systems in which each TSMA frame occupies a coherence band of a channel. In both cases the fixed stations may be fitted with a variable number of channels depending on the location and the time, with an increment equal to the number of communication channels contained in a TMSA frame. Finally, it is also possible to set up a variable-capacity system which is a variant of a mixed narrow-band TSMA/FDMA system and ordinated among the users so as to avoid mutual interference. In such a system, a communications channel uses a TSMA frame time interval with a carrier frequency according to a code determined by the law of the frequency jumps used. In what follows, this mixed system is referred to as the TSMA/CDMA/FDMA system, where CDMA signifies "code-division multiple-access".

Clearly, if the free channel seeking method described in the above French patent application No. 2 556 532 is to be applied to the mixed system referred to above, all of which comprise frequency-distribution multiple-access, the same difficulties arise as with systems of the pure FDMA systems.

SUMMARY OF THE INVENTION

It is an object of this invention to provide a method which avoids these channel seeking difficulties by making it possible to select a free channel and to change channels in any mobile radio system, especially one using the three mixed systems described, without any interruption during communications.

In accordance with the invention, a free channel seeking method of the type referred to above is noteworthy in that all the fixed stations also continuously transmit, in the signalling path channels allocated to them, the addresses of the duplex channels which they are using while, in mobile station M, the level received in said signalling path channels is measured. When the level measured in these channels exceeds an interference threshold, the fixed stations transmitting in these channels are termed interfering. The addresses of the duplex channels having descending paths which are engaged are identified in mobile station M by taking from among the duplex channels those having the addresses which are transmitted in the channels of the signalling as being used by the interfering fixed stations.

For some fixed stations the information identifying the duplex channels used, which is transmitted over the signalling path, may be received in the mobile stations at a level on the threshold of interference, and this may give rise to errors in receiving the information.

To avoid this, it is best for the interference threshold to be set at the threshold of good reception, and for the fixed stations to transmit over the signalling path channels at a level which is higher than those in the communication channels by an amount substantially equal to the difference between the threshold of good reception and said second threshold.

BRIEF DESCRIPTION OF THE DRAWINGS

The description below, given with reference to the attached drawings, all given by way of example, will show how the invention may be implemented.

FIGS. 2 and 3 are time-frequency graphs illustrating the structure of the signalling path used in the method of the invention and that of the descending communication path. FIG. 2 relates to a mixed time and frequency-distribution multiple-access system. FIG. 3 related to a mixed time, code and frequency-distribution system.

DESCRIPTION OF THE PREFERRED EMBODIMENTS

Figure 1:
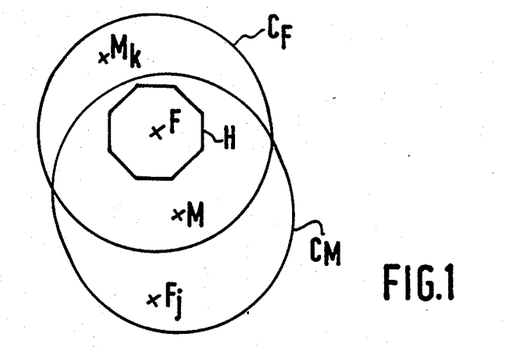
FIG. 1 shows the relative positions of the fixed and mobile stations in the "interference" areas.

In order to explain the method of the invention, FIG. 1 shows diagrammatically the relative positions of various fixed and mobile stations in a cellular mobile radio system. In these known systems, the area to be covered is divided into generally hexagonal cells, like cell H, each having a fixed station, like F, at its centre. Each fixed staion can transmit towards the mobile stations along communication channels forming a descending path. Let it be assumed that bi-directional communications are to be established between fixed station F, essentially covering an area defined by cell H, and a mobile station M. Mobile station M can transmit towards fixed stations in communication channels forming a rising path. The fixed stations may be fitted out to transmit and receive along all the system's communication channels. The aim of the method of the invention is to seek a pair of free rising and descending channels in order to establish bi-directional communications between a fixed station F and a mobile station M. As for the method described in the cited French patent application, each rising path is associated with a descending path to form a duplex communication channel which must be regarded as engaged if the rising or descending path thereof is engaged. The concept of interference areas, to be specified with reference to FIG. 1, will also be used.

It is possible to define around a fixed station like F an interference area CF within which any mobile station like $M_k$ could interfere with communications between F and mobile station M if the reception power in a channel in the rising path $M_k$ is greater than a first predetermined threshold.

It is also possible to define around a mobile station like M an interference area CM within which any fixed station like Fj could interfere with communications between M and fixed station F if the reception power in a channel in the descending path from Fj is greater than a second predetermined threshold.

In the free channel seeking method described in the above cited French Pat. No. 2 556 532, for the establishment of communications between stations F and M, fixed station F detects the channel rising paths which are engaged by communications with mobile stations Mk located in interference area CF. To do so, fixed station F measures the power levels received in all the channel rising communication paths and compares such measured levels with a first predetermined threshold, the engaged channels being those for which the measured level is higher than such threshold. The addresses of the duplex channels which are engaged in the rising path are then transmitted to all the mobile stations over a signalling path formed of equidistant time intervals successively and periodically allocated to all the fixed stations in a pattern of cells from which the cellular network is constituted. Also, according to the known method, mobile station M determines the channel descending paths which are engaged by communications with another fixed station Fj located in the mobile station's interference area CM by a direct method similar to that used in the fixed stations, i.e. by measuring the power level received in all the channel descending communications paths and comparing the measured levels with a second predetermined threshold, the engaged channels being those for which the measured level is higher than this threshold. From the addresses of the engaged duplex channels in the rising path transmitted over the signalling path and those of the engaged duplex channels in the descending path detected in mobile station M, the latter may easily select a free duplex communications channel with a different address from those of all the engaged duplex channels.

As has already been pointed out, however, the detection in mobile station M of the duplex channels having engaged descending paths by the direct method described above makes the known method hard to use in systems employing frequency-distribution multiple-access, either systems of the purely FDMA type or mixed FDMA and TSMA systems.

According to the present invention, the duplex channels having engaged descending paths are determined in a different manner, totally avoiding the difficulties of the known method. The determination is based on the observation that, in mobile station M, the level of the signal received is the same for all the channel descending paths used by a fixed station, including both the communications and the signalling channels.

Therefore, to identify the duplex communications channels which are engaged in the descending paths thereof by communications with a fixed station Fj located in accordance with interference area CM, it is possible, in this invention, to use the following two items of information in mobile station M:

an initial item of information which consists of a list of the interfering neighbouring stations Fj. This list may easily be made in mobile station M by measuring the signal levels in the channel descending paths and comparing them with a threshold in the various channels of the signalling path which carries signals sequentially transmitted by all the fixed stations in a cell pattern.

a second item of information which is a list of duplex communication channels used by all stations Fj, including the station F with which communication are to be established. This list, obviously known by each fixed station, may be continuously issued towards the mobile stations over the signalling path.

It is then easy to determine the duplex channels which are engaged in the descending path by taking from among the duplex communication channels used as supplied by the second item of information those arising from the interfering fixed stations provided by the first item of information.

It may be noted that the first item of information requires virtually no additional equipment in a mobile station. The level in the signalling path channels must already be measured to determine, as is necessary, the allocated fixed station, which is the one received at the highest level and likely to change with the movement of the vehicle conveying the mobile station.

Moreover, to avoid any error in the reception of the second item of information (the list of channels used) by a mobile station, which can receive the signalling path channels at a level on the interference threshold, it is best to increase, by a fixed and known number of decibels, the level transmitted in the signalling path channels so as to bring the interference threshold to the threshold of good reception. The difference between these two levels is of the order of 15 to 20 dB. Thus the fixed stations transmit at two power levels, one used for the communication channels and the higher, one for the signalling path channels.

Finally, with the method of this invention, each fixed station transmits on the signalling path:

for all the mobile stations, a list of the duplex communication channels which it uses (to determine the channels which are engaged in the descending path, as has just been explained);

for the mobile stations allocated to it, a list of the engaged duplex channels in the rising path (as in the method of the above cited French Patent).

Clearly, these two items of information transmitted by each fixed station may be combined in order to use a minimum number of binary elements.

A mobile station thus selects as a free duplex channel a channel other than:

duplex channels which are engaged in the rising path and which interfere with its allocated station these being on the list transmitted by the latter over the signalling path;

the duplex channels which are engaged in the descending path, as determined by the method of this invention.

This method may be used under the same circumstances as described in French Pat. No. 2 556 532; namely:

when mobile station M wishes to call a subscriber linked to the system or another mobile station, by measuring the levels in the signalling path, it selects the fixed station giving the best reception, which becomes its allocated station. It then selects a free duplex channel for its link.

when a fixed station F wishes to call one of the mobile stations M in its radius of action, it broadcasts the number of such mobile station over the signalling path and the latter station selects a free duplex channel using the method of the invention.

when, during communications between fixed station F and mobile station M, the latter is afflicted by interference from another fixed station Fj, station M seeks a fresh free duplex channel by the method of the invention and changes channels.

when, during a communication between mobile station M and fixed station F, the latter is afflicted by interference from another mobile station Mk, fixed station F informs mobile station M thereof by once again broadcasting its number via the semaphore path and mobile station M then seeks a free channel and changes channels.

finally, when, during a communication between fixed station F and mobile station M, the latter detects a fixed station F' which is better received than station F, mobile station M performs the same free-channel-seeking and channel-changing operations with, in addition, the transmission to the fixed station F and F' concerned the service information relating to the change of station.

The following description is of a structure for a signalling path making it possible to seek a free channel by the method of the invention without interrupting communications between a fixed and a mobile station, whatever the mobile radio system.

Here, all that is needed is for mobile station M to receive information from the signalling path regardless of the descending path channel used in communication with fixed station F. If this information is provided, stand-by in a mobile station can, of course, concern any channel in the descending path, which has the additional advantage that the method is insensitive to interference in a particular channel during a call.

The signalling path consists of equidistant time intervals allocated successively and periodically to all the fixed stations in a pattern of cells, said time intervals occurring simultaneously for all carrier frequencies usable by a fixed station. Of course all the time intervals of the signalling path must be synchronised for all the fixed stations in a mobile radio system and this synchronisation must be recovered in the mobile stations.

In a purely TSMA system corresponding to the special case of a single carrier frequency, the signalling path described in the above-cited French Pat. No. 2 556 532 is employed. In a purely TSMA system, there will be as many simultaneous time intervals for the signalling path as there are communication channels. As has already been pointed out, however, this system does not in practice permit different and progressive fitting out of the fixed stations.

Figure 2:
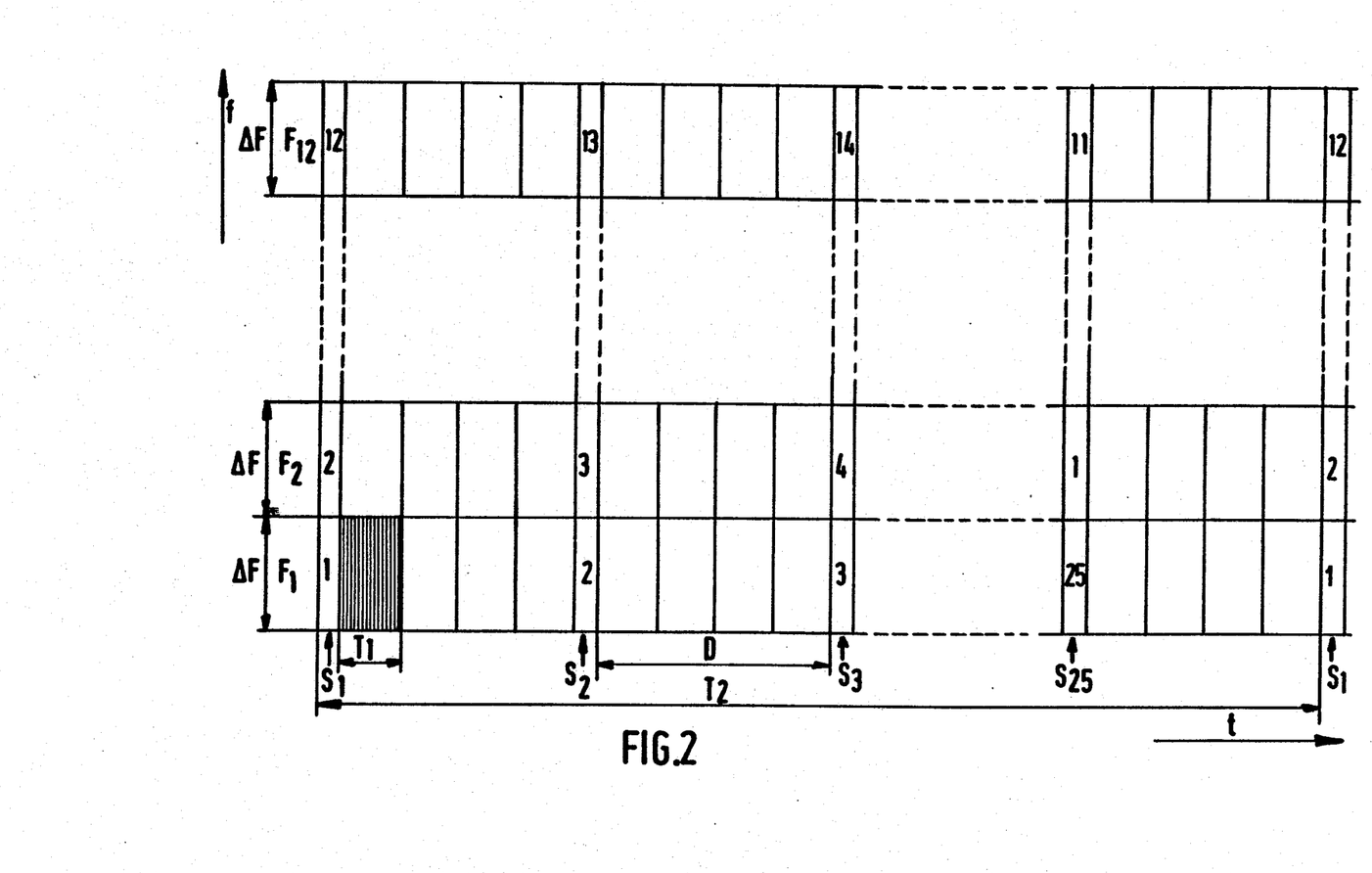
Figure 3:
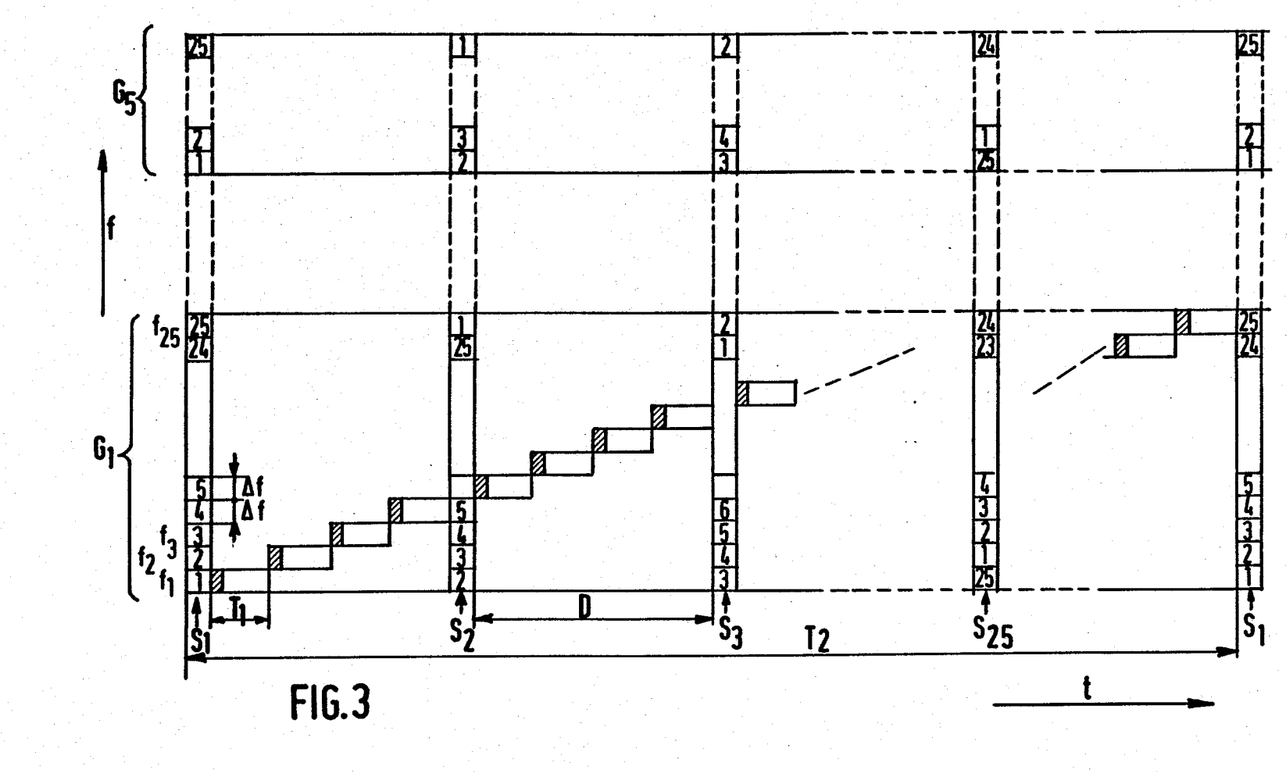

It will now be shown with reference to the diagrams of FIGS. 2 and 3 how it is possible to organise the signalling path in mixed systems making it possible to fit fixed stations out more easily in accordance with requirements.

On a time (+)-frequency (f) graph, FIG. 2 shows the structure of the descending communication and signalling paths for a wideband TMSA/FDMA system. A fixed station may be fitted with a number Nf of carrier frequencies upto a maximum of Nfm, each used to transmit TSMA frames of period T1. A TMSA frame comprises x time channels and occupies a band of width $\Delta F$. The bands $\Delta F$ are contiguous for all the carrier frequencies.

In the example shown, the maximum number of carrier frequencies is Nfm=12 and the band width $\Delta F$ is 2

MHz, so that the maximum band occupied by the descending communication path is 24 MHz. A TSMA frame comprises n=60 time channels 0.5 ms wide, so that a TSMA frame has a period T1=0.5 ms×60=30 ms.

The signalling path is made up of time intervals marked S with an index showing the number of time intervals in a signalling frame period T2. All the time intervals S occur at the same moment for all the carrier frequencies F1 to F12 and are separated by time D which is produced by a whole number N of the TSMA frame period T1. In the example chosen, N=4. In a signalling frame period T2 there is a number of time intervals S equal to the number (Ch) of cells in the cell pattern, so that all the fixed stations in the pattern can transmit successively during each period T2. In the example selected for FIG. 2, Ch=25 and the time intervals S shown are S1, S2, S3, ..., S25. If the time interval S of the semaphore channel is of the same duration 0.5 ms as that of a communication channel, the period of the semaphore frame is $$T2 = 0.5 \text{ ms} \times Ch(N.n+1) = 0.5 \text{ ms} \times 25(240+1) = 3.0125 \text{ s}.$$

The fixed stations transmit by circular permutation in both time and frequency. Thus, as shown in the example of FIG. 2 by numbers in the boxes corresponding to the time intervals S and the carrier frequencies, for carrier frequency F1, the successive time intervals S1, S2, S3, ..., S25 serve respectively for the transmission from fixed stations 1, 2, 3, ..., 25; for carrier frequency F2, time intervals S1, S2, S3, ..., S25 serve for the transmission from fixed stations 2, 3, 4, ..., 1; and so on until carrier frequency F12, for which the time intervals S1, S2, S3, ..., S25 serve for the transmission from fixed stations 12, 31, 14, ... 11. At any time interval S1 to S25 in the signalling path, all the fixed stations in a pattern transmit in this signalling path. It is of course possible to use another example of circular permutation, provided that all the fixed stations transmit in the Ch time intervals S of a signalling frame period. The condition for this is that the difference between the numbers of the fixed stations transmitting in succession is a first number with the size Ch of the pattern. In the example of Ch=25, the number 4 may be chosen for this difference. For carrier frequency F1, there would then be in succession for the intervals S1 to S25 the transmissions from fixed stations 1, 5, 9, 13, 17, 21, 25, 4, 8, 12, 16, 20, 24, 3, 7, 11, 15, 19, 23, 2, 6, 10, 14, 18, 22. For carrier frequency F2 there would be successive transmissions from fixed stations 5 to 1 in the above order. Finally, for carrier frequency F12, there would be in succession transmissions from fixed stations 20 to 16 in the above order.

With the signalling path structure just described, it is clear that on any communication channel (with any carrier frequency) where there is a mobile station on stand-by or in communication with a fixed station, this mobile station receives via the signalling path all the information from the fixed stations in pattern enabling it to seek a free channel. Moreover, the fixed stations may be fitted with a variable number Nf of carrier frequencies upto a maximum of Nfm depending on the time and space requirements. In the example of FIG. 2, Nfm=12. Whatever the carrier frequencies used, a mobile station will always receive, over the signalling path, the information needed to seek a free channel.

A TSMA narrow-band/TSMA system needs no special description. In relation to the system of FIG. 2, there is simply a narrower band ΔF, e.g. 200 kHz, for the TSMA channel frame, said frame comprising a smaller number of time channels, e.g. 6. The maximum number of carrier frequencies may be greater to give the same total number of communication channels. The structure of the signalling channel may be the same as in FIG. 2 with the same distance D between the intervals S of the signalling path and the same period T2 of the signalling path.

The time-frequency graph of FIG. 3 will rather be used to describe a TSMA narrow-band/CDMA/FDMA system. Here, each communication channel using a time interval of a TSMA frame is not supported by a fixed carrier frequency but by one which varies in jumps according to a given law.

In a system like that of FIG. 3, each fixed station must be fitted with a number Nf of multiple carrier frequencies of the size Ch of the selected pattern: Nf=KCh, where K is a whole number determining the number of groups in which the carrier frequencies are distributed. In the example of FIG. 3, these are distributed over 5 groups G1 to G5 each comprising 25 carrier frequencies, thus making the maximum number Nfm of carrier frequencies 125. The band width used around each carrier frequency to transmit the TSMA frame is Δf=0.2 MHz. These bands Δf are contiguous for all the carrier frequencies so that the maximum band occupied by the descending communication channel is 0.2 MHz×25×5=25 MHz.

The system operates in a similar way for each of the groups of carrier frequencies G1 to G5 and the description will relate more particularly to the structure of the communication channels and the signalling path for group G1.

A TSMA frame comprises 6 time intervals of duration 5 ms so that a TSMA frame has a period T1=5×6=30 ms. Each communication channel is made up of a time interval of the TSMA frame supported by a carrier frequency which varies in jumps according to a given law, with the time interval between two successive jumps being the period T1 of the TSMA frame. On the diagram of FIG. 3 the hatched boxes represent the time-frequency space occupied by a communication channel using a time interval and a frequency-jump law. In the example shown, the carrier frequencies used by the channel during a period of the frequency-jump law increase in the order from f1 to f25. Another order may of course be used, provided that the 25 carrier frequencies are used in this period. For group G1 of 25 carrier frequencies, 25 frequency-jump laws are possible, these laws being obtained by multiple time shifts of period T1 of the TSMA frame. Thus, the use in a fixed station of a group of carrier frequencies like G provides G×25=150 communication channels. By juxtaposing 5 groups of carrier frequencies acting like G1 it is possible to obtain 5×150=750 communication channels.

The signalling path is made up in a similar way to that shown in FIG. 2 with the aid of equidistant time intervals S, numbering Ch=25 in a signalling frame period T2. These time intervals marked S1 to S25 in a period T2 are produced at the same moments for all the carrier frequencies of the 5 frequency groups G1 to G5. These time intervals S of the signalling path are separated by a duration D which is the product of a whole number N of the TSMA frame period T1. The Ch fixed stations in a cell pattern may successively transmit in the Ch time intervals S of the signalling frame if N is a first number with Ch, which is produced in the example of FIG. 3, with Ch=25 and N=4. If the time interval S of the signalling channel is of the same duration 5 ms as that of a communication channel, the duration of the signalling frame period is $T2 = 5 \text{ ms} \times Ch(Nn+1) = 5 \text{ ms} \times 25(24+1) = 3.125 \text{ s}.$ The fixed stations transmit on the signalling path in circular permutation in both time and frequency. In the example of FIG. 3, where the carrier frequencies in group G1 are used in the frequency-jump laws in the order from f1 to f25, it will be seen that, for carrier frequency f1, the time intervals S1 to S25 serve for transmission from fixed stations 1 to 25, for carrier frequency f2, the time intervals S1 to S25 serve for transmission from fixed stations 2 to 1 and so on upto carrier frequency f25, for which time intervals S1 to S25 serve for transmission from fixed stations 25 to 24.

With this signalling path structure, if the fixed stations are fitted with carrier frequency group G1, a mobile station on stand-by or in communication with a fixed station on any communication channel using one of the 25 possible frequency-jump laws must receive via the semaphore path the information from all the fixed stations in a pattern, enabling it to seek a free channel to establish communication or change channel.

If the fixed stations are fitted with several carrier frequency groups G1 to G5, each group of Ch carrier frequencies (Ch=25) may use independent frequency-jump laws similar to those described for group G1. Likewise, the structure of the signalling path may be similar for each group to that described for group G1. Thus, any mobile station on stand-by or in communication on a given channel of one of groups G1 to G5 must receive, via the signalling channel, all the information it needs to seek a free channel.

The signalling channel messages transmitted by the fixed stations in all the carrier frequencies which they use (Nfm carrier frequencies at the most) have an identical content, viz:

the address of the fixed station transmitting the message;

the service information concerning the calls, i.e. the number of the mobile subscriber(s) sought and the nature of the call (call, return of call, acknowledgment of receipt, end of communication, order to change channels, etc.);

for free channel seeking according to the invention:
list L1 of the duplex channels used by the fixed station;
list L2 of the duplex channels recognised as engaged by the fixed station, using level measurements in the rising path channels;
in addition, a signalling channel messages states:
in a TSMA wide-band/FDMA system, the carrier frequency(ies) Nf fitted to the fixed station, and preferably a single carrier frequency selected by the fixed station and for use by the mobile station in selecting a communication channel;
in a TSMA narrow-band/CDMA/FDMA system, the carrier frequency group(s) fitted to the fixed station (i.e. the value(s) of K in Nf=KCh), and preferably a single group selected by the fixed station for use by the mobile station in selecting a communication channel.

By transmitting these last two items of information, a fixed station can thus at any time guide the choice of the free channel by the mobile stations to the carrier frequency with the lightest engaged channel load or to the least-loaded group of carrier frequencies. When, for instance, a carrier frequency (or group thereof) is fitted to a fixed station, but not its neighbours, this fixed station will guide the choice of the mobile stations to this frequency or group of frequencies. Moreover, if several requests for calls are transmitted in a message by the fixed station, it shows in the corresponding signalling channel messages a carrier frequency or group thereof which differs for each mobile station. It is thus possible to avoid the risk that several mobile stations called will select the same channel at the same time.

In addition, by transmitting the two latter items of information, the fixed station can limit the channels in lists L1 and L2 to those forming part of the carrier frequency or group thereof selected, thus reducing the number of bits in the signalling channel message.

Figure 4:
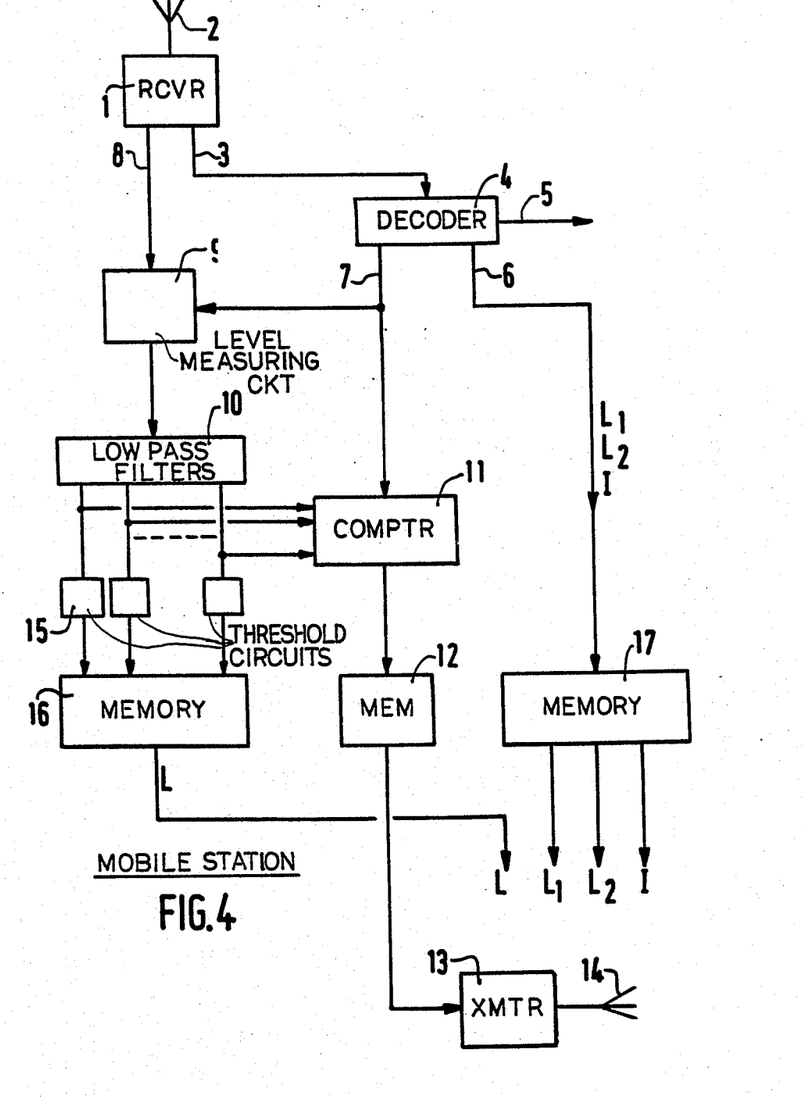
FIG. 4 is a block diagram of apparatus for implementing the method of the invention in a mobile station.

The method of the invention may be implemented in a mobile station as shown in the diagram of FIG. 4. This block diagram shows only the main components involved in performing the method.

According to FIG. 4, a mobile station comprises a radio receiver 1 connected to a receiving aerial 2. Output 3 of the receiver supplies the demodulated output signal which is applied to a decoder 4. The latter, at its output 5, provides the decoded data or voice signal transmitted to the receiver in the selected communication channel. Output 6 of the decoder provides the information received in the signalling path concerning the search for the free channel. Finally, assuming that synchro-bit and synchro-frame devices are incorporated into the decoder, output 7 of the decoder supplies the synchro-frame signal of the signalling path (frame with Ch successive time intervals determining the Ch channels of the signalling path). Radio receiver 1 also has an auxiliary low-frequency output 8 in front of the limiter and thus making it possible to measure the reception level. The signal at this output 8 is applied to a level-measuring device 9 which also receives the synchro-frame signal of the semaphore path and thus provides the level measured in the Ch channels thereof. The measured levels leaving device 9 are guided in device 10 to Ch low-pass filters, each providing a mean of the level measured over several semaphore frame periods in order to avoid any irregularities in the level measurements. The level in the Ch channels of the signalling path from the Ch fixed station of a cell pattern is thus obtained at the outputs of device 10. The levels supplied by device 10 are compared together in comparator circuit 11 at the characteristic moments S of the synchro-frame signal. Comparator circuit 11 determines the highest level and the position of the corresponding channel in the signalling path frame, which gives the address of the allocated fixed station, which is stored in memory 12. This address is supplied to radio transmitter 13 for broadcasting via transmission aerial 14. Transmitter 14, of course, receives other signals to be broadcast (procedure messages, voice or data signals) but these have not been shown for the sake of simplicity.

In order to implement the method of the invention, the Ch measured levels supplied by device 10 are applied to Ch threshold circuits like 15. The threshold shared by these circuits is the "interference" threshold. If the level received in a channel exceeds this interference threshold, the fixed station which has transmitted on this channel is regarded as interfering. List L of the addresses of the fixed interfering stations which have a level beyond the interference threshold are stored in address memory 16.

Moreover, output 6 of decoder 4 provides the information received in the various channels of the signalling path, i.e. for each signalling path, list L1 of the communication channels used by the fixed station transmitting into the signalling channel, list L2 of the channels recognised as engaged by this fixed station, finally information I showing the carrier frequency(ies) (or groups thereof) to be used to seek a free channel. This information received in the signalling path are stored in memory 17.

List L of the interfering fixed stations stored in memory 16 and lists L1, L2 and information I stored in memory 17 are read out of these memories in the event of circumstances requiring a change of channel. From L, L1, L2 and I, a free duplex channel may easily be selected using the method of the invention as described above. In short, to be selected a duplex channel:

must be one of the channels determined by information I;

must not be found in list L2 of the engaged channels in the rising path;

must not be found in list L1 of the channels used and originating from interfering fixed channels in list L.

Figure 5:
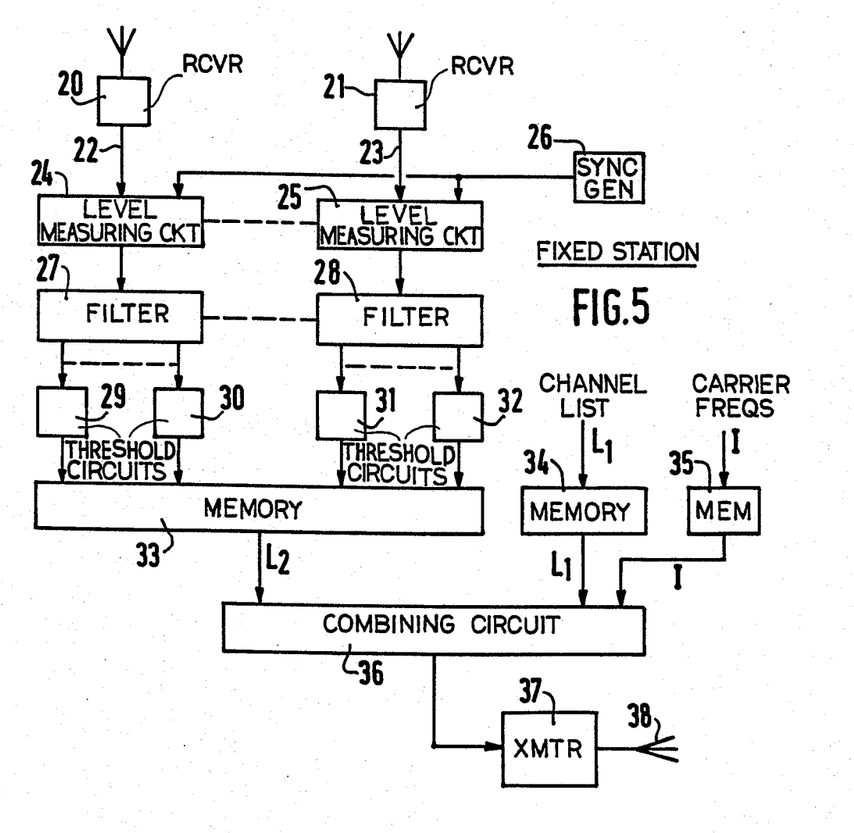
FIG. 5 is a block diagram of apparatus for implementing the method of the invention in a fixed station.

The means used to implement the method of the invention in a fixed station are shown in FIG. 5. If the fixed station is fitted out for Nf carrier frequencies, it comprises Nf fixed-frequency radio receivers like 20 and 21, fitted with receiver aerials and having, like receiver 1 of the mobile station of FIG. 4, an auxiliary low-frequency output in front of the receiver limiter. The signals at these low-frequency outputs 22, 23 are applied to level measuring circuits 24, 25 which also receive, from a sychronizing signal generator 26 the synchro-frame signal of the TSMA communication channels (frame with n successive time intervals). Each measuring circuit 24, 25 thus supplies the measured level of the n channels of the rising communication path. The measured levels supplied by 24, 25 for the respective channels are guided to n lowpass filters 27, 28. This, at the output of all the further 27, 28 are obtained the levels measured in the nNf channels of the rising communication path. These measured levels are applied to nNf regulated threshold circuits like 29, 30 and 31, 32. All these circuits are set to the same threshold (referred to above as the first) and the channels where this threshold is exceeded are recognised as engaged. The information on these excesses of the thresholds is applied to nNf-bit memory 33 and, when this is read out, it provides list L2 of the channels recognised as engaged by the fixed station. Moreover, list Li of the channels used by the fixed station is supplied to memory 34. Finally, information I of the carrier frequency(ies) (or groups thereof) to be used in seeking a free channel is supplied to memory 35. The message to be transmitted in the signalling path, comprising lists L1 and L2 and information I, is combined in circuit 36 for application to transmitter 37, in turn for broadcasting via aerial 38.

What is claimed is:

1. A method of enabling a mobile station (M) to select a free duplex channel for communicating with a fixed station (F) in a cellular mobile radio system having a plurality of duplex channels each of which has a rising communication path and an associated descending communication path, respective duplex channels having respective addresses and providing communication between respective ones of a plurality of fixed stations and a plurality of mobile stations, the fixed stations being located in a pattern of cells constituting the cellular system; such method comprising:

each fixed station identifying the addresses of duplex channels having rising paths which are engaged by detecting whether the signal power level in each received rising path exceeds a first given threshold, and transmitting the addresses of such channels to the mobile stations over a signalling path comprising equidistant time interval channels which are successively and periodically allotted to the respective fixed stations in the cellular system;

determination by each mobile station of the addresses of duplex channels having descending paths which are engaged by detecting whether the signal power level in each received descending path exceeds a second given threshold; and selection by the mobile station (M) of a free duplex channel from among duplex channels having addresses differing from those of channels which are engaged in the rising paths and those which are engaged in the descending paths;

such method being characterized by:

continuous transmission by each of the fixed stations, in the signalling path time interval channels respectively allotted to them, of the addresses of duplex channels which they are using and of which of such channels having engaged descending paths;

detection by the mobile station (M) of the signal power level in the signalling path time interval channels received from the respective fixed stations, and identification as interfering stations those for which such received signal power level exceeds a predetermined interference threshold but is below the maximum received signal power level; and determination by the mobile station (M) of the addresses of duplex channels of fixed station (F) having engaged descending paths by eliminating from the address of all duplex channels having engaged descending paths the addresses of duplex channels of interfering fixed stations.

2. A method as claimed in claim 1, wherein said predetermined interference threshold is set at the threshold of good reception, and the fixed stations transmit in their respective signalling path channels at a power level which exceeds the transmission power level in the duplex channels by an amount substantially equal to the difference between said threshold of good reception and said second given threshold of the received power level in descending paths of engaged duplex channels.

3. A method as claimed in claim 1, wherein the time interval channels in the signalling path for the respective fixed stations are simultaneously produced at each of a plurality of carrier frequencies assigned to each of the fixed stations for communication over the duplex channels.

4. A method as claimed in claim 3, wherein the mobile radio system employs a mixture of time-sharing multiple access (TMSA) and frequency-division multiple access (FDMA), each fixed station having a variable number of FDMA carrier frequencies assigned to it and transmitting at each such frequency successive TSMA frames respectively comprising a number N of time-division multiplexed communication channels; such method being further characterized in that the time intervals channels in the signalling path are separated by a duration which is a multiple of the TSMA frame period, the number of such time interval channels in the signalling path being equal to the number Ch of cells in the pattern constituting said cellular radio system; and the fixed stations in such pattern transmit by circular permutation of the time interval channels in the signalling path and the carrier frequencies respectively assigned to such stations.

5. A method as claimed in claim 4, wherein to enable a mobile station (M) to select a free duplex channel for communication with a fixed station (F) the fixed station (F) also transmits over its time interval channel in the signalling path information which identifies the carrier frequencies to be used by the mobile station (M) for making such a selection.

6. A method as claimed in claim 4, wherein the mobile radio system additionally employs code-division multiple access (CDMA), each fixed station having a variable number of FDMA carrier frequencies assigned to it and each TSMA frame comprising N multiplexed time-division channels which are transmitted at a carrier frequency which is varied in jumps according to a predetermined code; such method being further characterized in that the number of carrier frequencies is divided into an integral number of groups (K), and the time interval channels in the signalling path are separated by a duration (D) which is an integral multiple of the TSMA frame period; and the fixed stations in the cell pattern transmit by circular permutation of the time interval channels in the signalling path and the carrier frequencies in each of said K groups of frequencies.

7. A method as claimed in claim 6, wherein to enable a mobile station (M) to select a free duplex channel for communication with a fixed station (F) the fixed station (F) also transmits over its time interval channel in the signalling path information which identifies the group of carrier frequencies to be used by the mobile station (M) for making such a selection.

8. A receiver for use in a mobile station of a cellular mobile radio system wherein a free duplex communication channel is selected by such mobile station by a method as claimed in claim 10, comprising:
   a signal power level measurement circuit for measuring the power level of signals received by the mobile station in the respective time intervals channels in the signalling path;
   a plurality of low-pass filters for receiving the power levels measured in the signal power level measurement circuit and determining the mean values thereof over several frame periods of the channels in the signalling path;
   a plurality of threshold circuits connected to outputs of said low-pass filters for measuring whether the mean values determined thereby exceed the interference threshold level of interfering fixed stations and supplying, when such threshold is exceeded, the addresses of the interfering fixed stations;
   first memory means for receiving and storing the interfering station addresses supplied by said threshold circuits;
   second memory means for storing the information transmitted in the signalling channel to the mobile station by the fixed stations identifying duplex channels having descending paths which are engaged; and
   means for reading out the information stored in said first and second memories to enable the mobile station to select a free duplex channel.

9. Apparatus for used in a fixed station (F) of a cellular mobile radio system wherein a free duplex communication channel is selected by a mobile station (M) by a method as claimed in claim 5, such system having a plurality of fixed stations which receive signals from a plurality of mobile stations in rising paths of a plurality of duplex communication channels, such apparatus comprising:
   a level measuring circuit for measuring the power levels of signals received by the fixed station (F) from the rising paths of the duplex communication channels;
   a plurality of low-pass filters which receive the measured power levels from said level measuring circuit;
   a plurality of threshold circuits connected to the low-pass filters and respectively producing, when a first threshold power level of signals in said rising paths of the duplex communication channels is exceeded, the addresses of the duplex channels having such rising paths, such addresses identifying duplex channels which are engaged;
   first memory means connected to said threshold circuits for storing a list of the engaged duplex channels;
   second memory means for storing addresses of duplex channels used by the fixed station (F) and also storing carrier frequencies to be used by the mobile station (M) for identifying a free duplex communication channel; and
   means for combining the information stored in said first and second memory means and supplying the combined information for transmission to mobile station (M) over a signalling path channel allocated to said fixed station (F).

* * * * *